United States Patent
Kobayashi (10) Patent No.: US 10,303,160 B2
(45) Date of Patent: May 28, 2019

(54) NUMERICAL CONTROL SYSTEM AND NUMERICAL CONTROLLER HAVING DISPLAY SWITCHING FUNCTION

(71) Applicant: FANUC CORPORATION, Minamitsuru-gun, Yamanashi (JP)

(72) Inventor: Hideo Kobayashi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 74 days.

(21) Appl. No.: 15/784,536

(22) Filed: Oct. 16, 2017

(65) Prior Publication Data

US 2018/0113439 A1 Apr. 26, 2018

(30) Foreign Application Priority Data

Oct. 21, 2016 (JP) ................. 2016-207229

(51) Int. Cl.
   *G05B 19/408* (2006.01)
   *G05B 19/409* (2006.01)
   *G05B 19/414* (2006.01)
   *G05B 19/4063* (2006.01)

(52) U.S. Cl.
   CPC ......... *G05B 19/414* (2013.01); *G05B 19/408* (2013.01); *G05B 19/409* (2013.01); *G05B 19/4063* (2013.01); *G05B 2219/36137* (2013.01)

(58) Field of Classification Search
   CPC .. G05B 19/414; G05B 19/409; G05B 19/408; G05B 19/4063; G05B 2219/36137
   USPC ........................................ 700/17
   See application file for complete search history.

(56) References Cited

U.S. PATENT DOCUMENTS

| | | | |
|---|---|---|---|
| 2003/0014498 A1* | 1/2003 | Kreidler | G05B 19/0426 709/217 |
| 2009/0043883 A1* | 2/2009 | Aydt | G05B 23/0297 709/224 |
| 2014/0042950 A1* | 2/2014 | Aoyama | G05B 19/4148 318/569 |

FOREIGN PATENT DOCUMENTS

| | | |
|---|---|---|
| CN | 103676755 | 3/2014 |
| CN | 105425692 | 3/2016 |
| CN | 105706009 | 6/2016 |
| JP | 2000-181524 | 6/2000 |
| JP | 2002-108423 | 4/2002 |
| JP | 2002-251298 | 9/2002 |

(Continued)

OTHER PUBLICATIONS

Office Action dated Dec. 20, 2018 in corresponding Chinese Application No. 201710959776.X.

*Primary Examiner* — Ziaul Karim
(74) *Attorney, Agent, or Firm* — Wenderoth, Lind & Ponack, L.L.P.

(57) ABSTRACT

Provided are a connection unit for connection between a numerical control unit and an HMI functional unit, and a network connection unit for connection to a network. The HMI functional unit includes a display control unit for display on a display unit. The numerical control unit includes: an error detection unit that detects an error in the HMI functional unit; a connection control unit that releases connection to the connection unit and sets up connection to the network connection unit if the error detection unit detects the error in the HMI functional unit; and an alarm notification unit that notifies an alarm to a management terminal.

8 Claims, 9 Drawing Sheets

(56) References Cited

FOREIGN PATENT DOCUMENTS

| JP | 2014-038562 | 2/2014 |
| JP | 2015-179400 | 10/2015 |
| JP | 2016-057936 | 4/2016 |

* cited by examiner

NUMERICAL CONTROL SYSTEM AND NUMERICAL CONTROLLER HAVING DISPLAY SWITCHING FUNCTION

This application is based on and claims the benefit of priority from Japanese Patent Application No. 2016-207229, filed on 21 Oct. 2016, the content of which is incorporated herein by reference.

BACKGROUND OF THE INVENTION

Field of the Invention

The present invention relates to a numerical control system and a numerical controller having a display switching function.

Related Art

In many display units installed on numerical controllers, HMI functional units have been added to the numerical controllers for high-performance graphic display. In a numerical controller having an HMI functional unit, on the occurrence of a problem occurs in the HMI functional unit to prohibit the HMI functional unit from working further, a screen to be displayed on a display unit has been brought into a situation in some cases where the screen cannot be updated to be frozen or nothing is displayed on the screen. In such cases, mechanical information about a machine tool to be controlled by the numerical controller cannot be acquired from display on the display unit. Additionally, if the display unit has not only the function of displaying mechanical information but also the function of accepting operation on the machine tool from a user, failing to recover the HMI function has made operation on the machine tool impossible in some cases.

In this regard, patent document 1 discloses a technique by which a control unit releases connection to an operation unit in response to detection of an error in the operation unit.

According to a technique disclosed by patent document 2, a control system includes a numerical controller and an operation device. If a working situation monitoring unit in the operation device detects an error in an input control unit, an error signal is issued. If the input control unit is recovered, a recovery signal is issued.

Patent Document 1: Japanese Unexamined Patent Application, Publication No. 2002-108423

Patent Document 2: Japanese Unexamined Patent Application, Publication No. 2015-179400

SUMMARY OF THE INVENTION

However, the invention of patent document 1 is merely to release connection between the control unit and the operation unit. This invention is not to assure restart of operation by the operation unit even if an error in the operation unit is removed.

Further, the invention disclosed by patent document 2 is strictly for transmission of an error signal and a recovery signal from the working situation monitoring unit to the numerical controller. Patent document 2 does not disclose a particular way of recovering operation on the numerical controller.

The present invention is intended to provide a numerical control system that achieves the following in response to a problem occurring in an HMI function of a numerical controller: to switch a screen for display to a display unit of a different device and display data on the switched screen necessary for execution of a program in the numerical controller having the problem in the HMI function; and to input an instruction or data from a user through the switched screen.

(1) A numerical control system according to the present invention (numerical control system 10 described later, for example) comprises a numerical controller (numerical controller 100 described later, for example), a management terminal (management terminal 200 described later, for example), and a terminal device (terminal device 300 described later, for example) connectable to each other through a network (network 400 described later, for example). The numerical controller comprises: a numerical control unit (numerical control unit 110 described later, for example); an HMI functional unit (HMI functional unit 120 described later, for example); a display unit (display unit 130 described later, for example); a connection unit (connection unit 151 described later, for example) for connection between the numerical control unit and the HMI functional unit; and a network connection unit (network connection unit 152 described later, for example) for connection to the network. The HMI functional unit comprises a display control unit (display control unit 122 described later, for example) that generates display data based on information received from the numerical control unit through the connection unit, and displays the generated display data on the display unit. The numerical control unit comprises: an error detection unit (error detection unit 112 described later, for example) that detects an error in the HMI functional unit; a connection control unit (connection control unit 113 described later, for example) that releases connection to the connection unit and sets up connection to the network connection unit if the error detection unit detects the error in the HMI functional unit; and an alarm notification unit (alarm notification unit 114 described later, for example) that notifies a first alarm to the management terminal through the network connection unit. The management terminal comprises: a control unit (control unit 210 described later, for example); and a network connection unit (network connection unit 230 described later, for example) for connection to the network. The control unit comprises: a first alarm detection unit (alarm detection unit 211 described later, for example) that detects the first alarm notified from the numerical controller; and a second alarm notification unit (alarm notification unit 212 described later, for example) that notifies a second alarm to the terminal device if the first alarm detection unit detects the first alarm. The terminal device comprises: a display unit (display unit 320 described later, for example) for display of data; an HMI functional unit (HMI functional unit 310 described later, for example); and a network connection unit (network connection unit 330 described later, for example) for connection between the network and the HMI functional unit of the terminal device. The HMI functional unit of the terminal device comprises: a second alarm detection unit (alarm detection unit 312 described later, for example) that detects the second alarm notified from the management terminal; a connection control unit (connection control unit 313 described later, for example) that connects to the numerical controller through the network connection unit of the terminal device if the second alarm detection unit detects the second alarm; and a display control unit (display control unit 314 described later, for example) that generates display data based on information received from the numerical controller through the network connection unit of the terminal device, and displays the generated display data on the display unit of the terminal device.

(2) In the numerical control system described in (1), the connection unit (connection unit 151 described later, for example) for connection between the numerical control unit (numerical control unit 110 described later, for example) and the HMI functional unit (HMI functional unit 120 described later, for example), the network connection unit (network connection unit 152 described later, for example) for connection between the numerical controller and the network, the network connection unit (network connection unit 230 described later, for example) for connection between the management terminal and the network, and the network connection unit (network connection unit 330 described later, for example) for connection between the terminal device and the network may have the same interface.

(3) In the numerical control system described in (2), the interface may be an Ethernet (registered trademark) interface.

(4) In the numerical control system described in (1) to (3), the second alarm notification unit (alarm notification unit 212 described later, for example) may select one terminal device from multiple terminal devices, and notify the second alarm to the selected terminal device.

(5) In the numerical control system described in (1) to (4), the terminal device may be a numerical controller (numerical controller 350 described later, for example) further comprising a numerical control unit (numerical control unit 340 described later, for example).

(6) A numerical controller according to the present invention (numerical controller 100 described later, for example) is connectable to a management terminal (management terminal 200 described later, for example) and a terminal device (terminal device 300 described later, for example) through a network. The numerical controller comprises: a numerical control unit (numerical control unit 110 described later, for example); an HMI functional unit (HMI functional unit 120 described later, for example); a display unit (display unit 130 described later, for example); a connection unit (connection unit 151 described later, for example) for connection between the numerical control unit and the HMI functional unit; and a network connection unit (network connection unit 152 described later, for example) for connection to the network. The HMI functional unit comprises a display control unit (display control unit 122 described later, for example) that generates display data based on information received from the numerical control unit through the connection unit, and displays the generated display data on the display unit. The numerical control unit comprises: an error detection unit (error detection unit 112 described later, for example) that detects an error in the HMI functional unit; a connection control unit (connection control unit 113 described later, for example) that releases connection to the connection unit and sets up connection to the network connection unit if the error detection unit detects the error in the HMI functional unit; and an alarm notification unit (alarm notification unit 114 described later, for example) that notifies an alarm to the management terminal through the network connection unit.

(7) In the numerical controller described in (6), the connection unit (connection unit 151 described later, for example) for connection between the numerical control unit and the HMI functional unit, and the network connection unit (network connection unit 152 described later, for example) for connection between the numerical controller and the network may have the same interface.

(8) In the numerical controller described in (7), the interface may be an Ethernet (registered trademark) interface.

The present invention achieves the following in response to a problem occurring in an HMI function of a numerical controller: to switch a screen for display to a display unit of a different device and display data on the switched screen necessary for execution of a program in the numerical controller having the problem in the HMI function; and to perform operation of inputting an instruction or data from a user through the switched screen.

DETAILED DESCRIPTION OF THE INVENTION

1 First Embodiment

A first embodiment of the present invention will be described below in detail by referring to FIGS. 1 to 6.
[1.1 Configuration of Invention]

Figure 1:
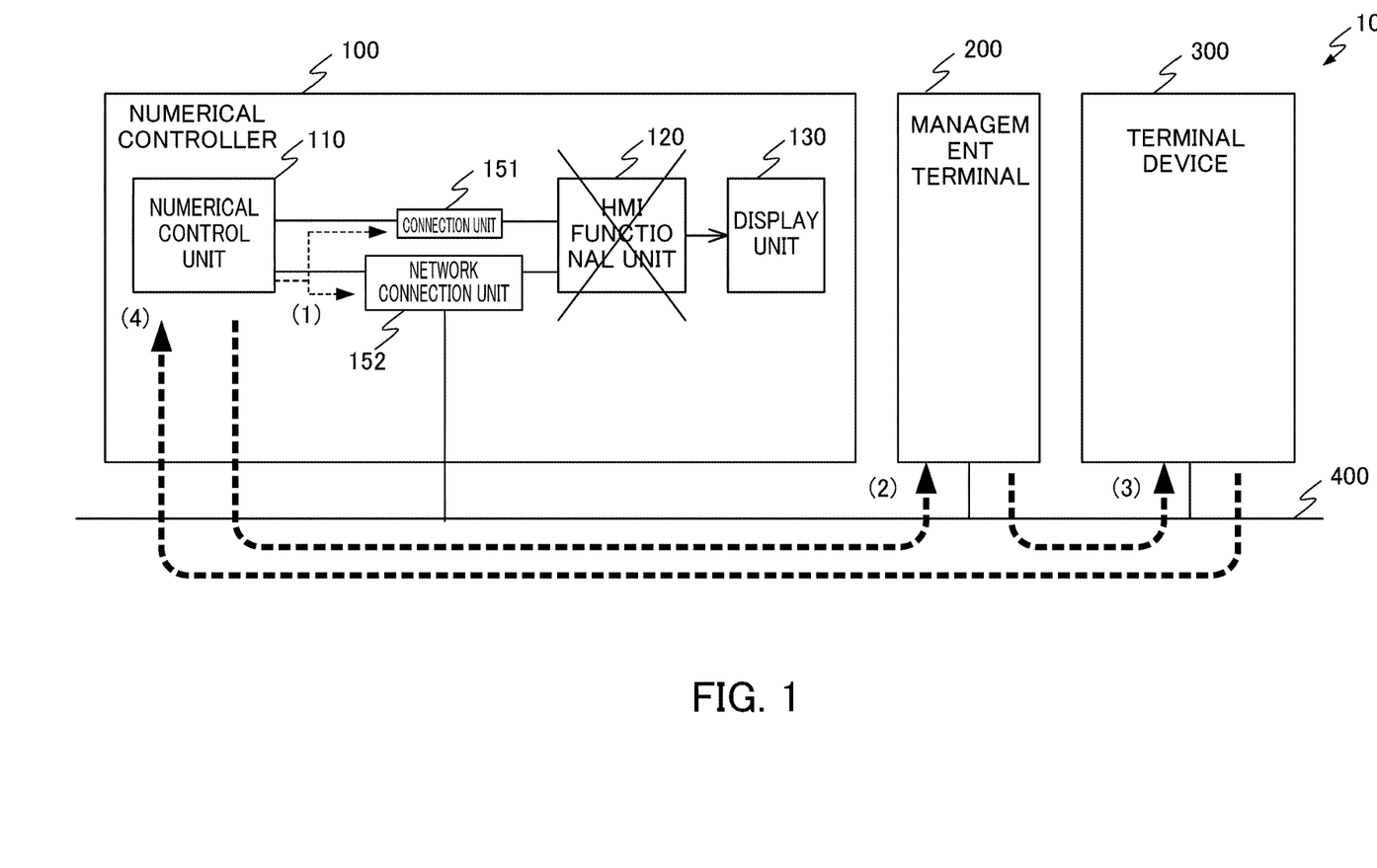
FIG. 1 shows the configuration of a numerical control system according to a first embodiment of the present invention.

FIG. 1 shows the configuration of a numerical control system 10 according to the first embodiment of the present invention. The numerical control system 10 includes a numerical controller 100, a management terminal 200, and a terminal device 300 connected to each other through a network 400. The numerical controller 100 is a device for numerical control over a machine tool (not shown in the drawings). The numerical controller 100 includes a numerical control unit 110, an HMI functional unit 120, and a display unit 130. The numerical control unit 110 and the HMI functional unit 120 are connected to each other through a connection unit 151. The numerical control unit 110 is connected to the network 400 through a network connection unit 152. One of the functions of the numerical control unit 110 is to execute a program for numerical control over the above-described machine tool. The display unit 130 is a unit for display of data necessary for execution of this program and for input of an instruction or data from a user. The HMI functional unit 120 generates display data based on information received from the numerical control unit 110 through the connection unit 151, and displays the generated display data on the display unit 130. If a trouble occurs in the HMI functional unit 120 of the numerical controller 100 to disable display of display data on the display unit 130 and operation from a user, the terminal device 300 becomes operable as a substitute device to display this display data and accept operation from the user. The management terminal 200 is a device for management of the numerical controller 100 and the terminal device 300.

The following briefly describes how the numerical control system 10 according to the first embodiment works. If a trouble occurs in the HMI functional unit 120 so no response to a transmission signal from the numerical control unit 110 to the HMI functional unit 120 is given, for example, the numerical control unit 110 releases connection to the connection unit 151 between the numerical control unit 110 and the HMI functional unit 120, and sets up connection to the network connection unit 152 between the numerical control unit 110 and the network 400 as shown by (1) in FIG. 1. Next, as shown by (2), the numerical control unit 110 notifies an alarm to the management terminal 200 in a higher layer indicating the occurrence of the trouble in the HMI functional unit 120. In response to notification of the alarm from the numerical control unit 110 as a trigger, a monitoring application starts working in the management terminal 200. In response to execution of this monitoring application, the management terminal 200 notifies an alarm to the terminal device 300 as shown by (3). Finally, as shown by (4), the terminal device 300 having received the notified alarm connects to the numerical control unit 110 of the numerical controller 100 to display a screen necessary for numerical control and accept operation from a user.

[1.2 Numerical Controller]

Figure 2:
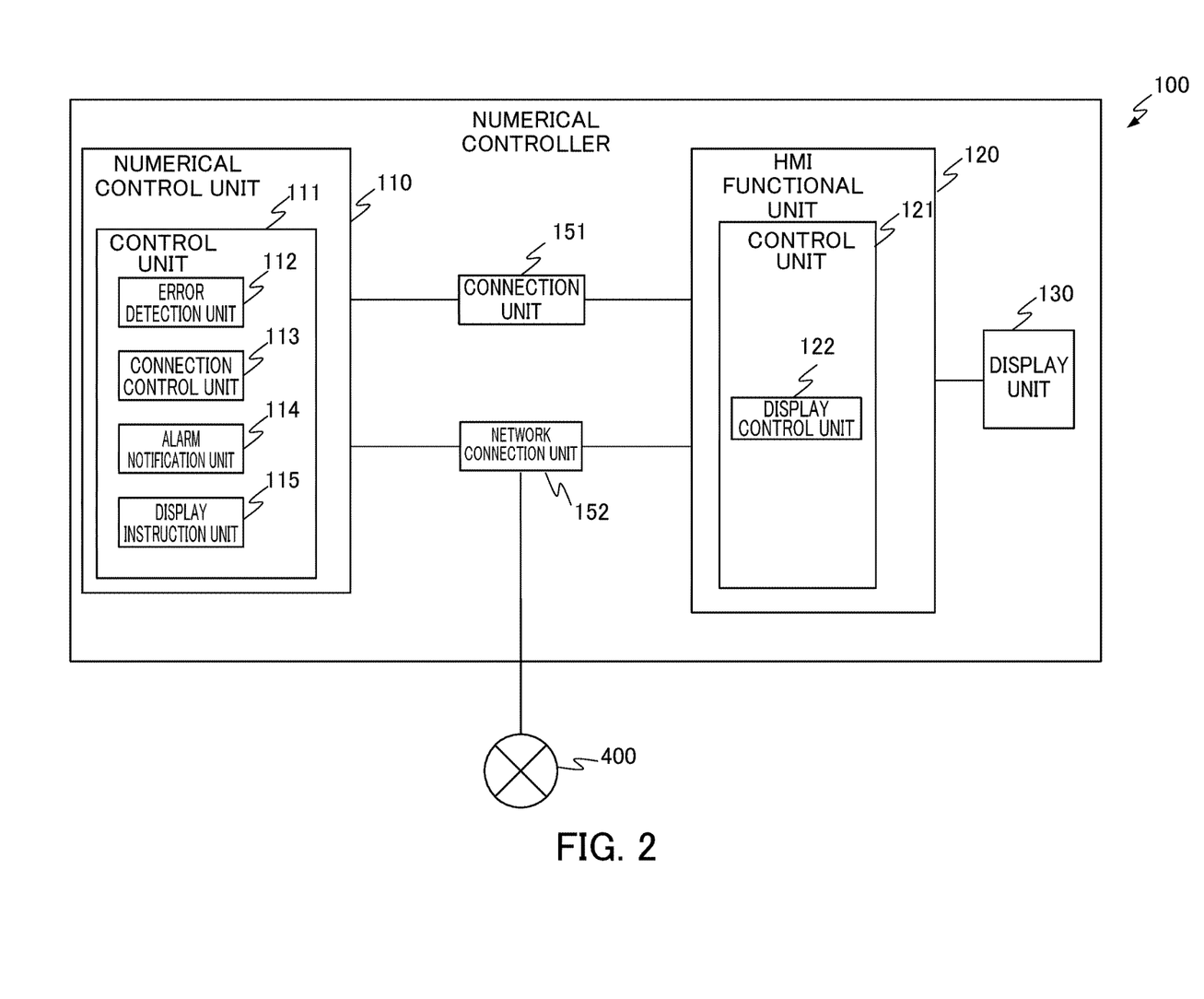
FIG. 2 shows the configuration of a numerical controller according to the first embodiment of the present invention.

FIG. 2 shows the configuration of the numerical controller 100. As already described above, the numerical controller 100 includes the numerical control unit 110, the HMI functional unit 120, and the display unit 130. The numerical control unit 110 and the HMI functional unit 120 are connected to each other through the connection unit 151. The numerical control unit 110 is connected to the network 400 through the network connection unit 152.

The numerical control unit 110 includes a control unit 111. The control unit 111 is a processor that controls the numerical controller 100 entirely. The control unit 111 reads a system program and an application program from a ROM (not shown in the drawings) through a bus to realize the functions of the following units in the control unit 111 by following the read system program and application program: an error detection unit 112, a connection control unit 113, an alarm notification unit 114, and a display instruction unit 115. By using a known method such as the above-described method of using the absence of a response to a transmission signal to the HMI functional unit 120 as a trigger, for example, the error detection unit 112 detects an error in the HMI functional unit 120. If the error detection unit 112 detects the error in the HMI functional unit 120, the connection control unit 113 releases connection to the connection unit 151 and sets up connection to the network connection unit 152. After the connection control unit 113 releases connection to the connection unit 151 and sets up connection to the network connection unit 152, the alarm notification unit 114 notifies an alarm to the management terminal 200. The display instruction unit 115 instructs the HMI functional unit 120 or the terminal device 300 described later to display data. The connection unit 151 and the network connection unit 152 have the same interface.

The HMI functional unit 120 includes a control unit 121. The control unit 121 is a processor that controls the HMI functional unit 120 entirely. The control unit 121 realizes the function of the display control unit 122 in the control unit 121 by following a system program and an application program stored in a ROM (not shown in the drawings). The display control unit 122 generates display data based on information received from the numerical control unit 110 through the connection unit 151, and displays the generated display data on the display unit 130.

The display unit 130 displays data necessary for the numerical controller 100 for numerical control over the machine tool (not shown in the drawings) based on the display data received from the control unit 121. Further, the display unit 130 accepts operation from a user.

Like a general numerical controller, the numerical controller 100 may have the following configuration and the following function. Specifically, the numerical controller 100 may include an axis control circuit or a spindle control circuit for each axis not shown in the drawings. Additionally, a programmable machine controller (PMC) may output a signal through an I/O unit to an auxiliary device (an actuator such as a robot hand for tool exchange, for example) of the machine tool to control the auxiliary device by following a sequence program provided in the numerical controller 100. Further, the numerical controller 100 may accept signals input through various switches, etc. of an operator's panel arranged at the body of the machine tool, execute necessary signal processing, and transfer the processed signals to the control unit 111.

Figure 3:
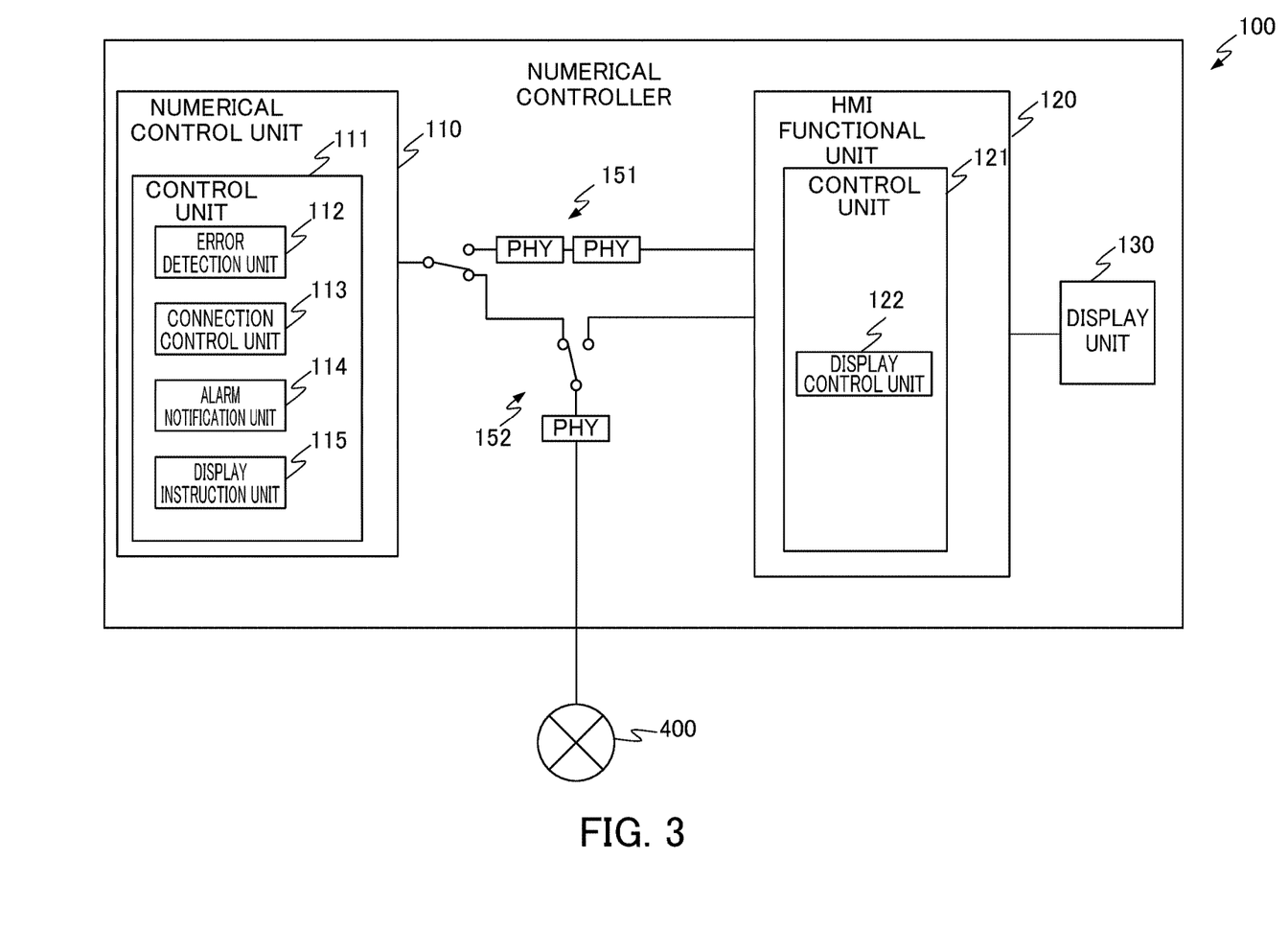
FIG. 3 shows an example of the configuration of the numerical controller according to the first embodiment of the present invention.

As shown in FIG. 3, the connection unit 151 and the network connection unit 152 may be realized by the same communication protocol such as Ethernet (registered trademark) and may be controlled by switching connection to physical layers (PHY).

[1.3 Management Terminal]

Figure 4:
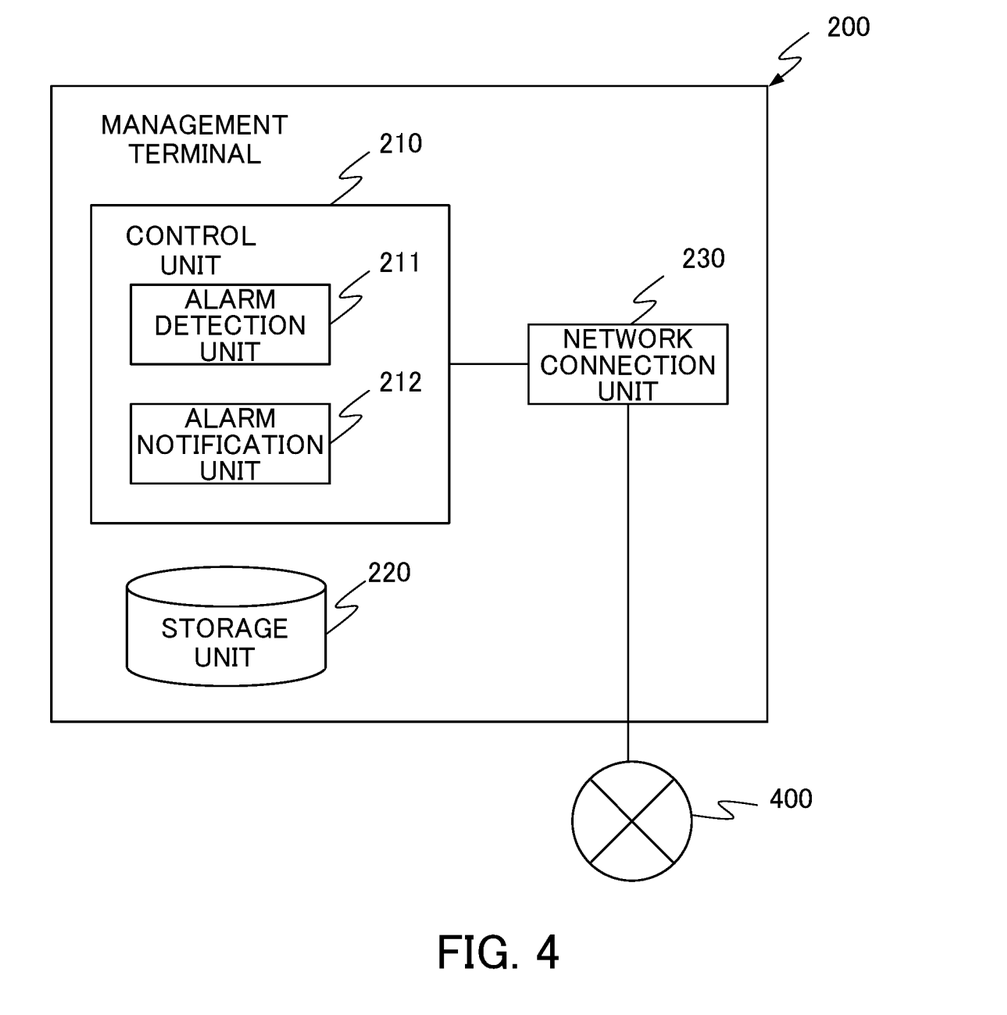
FIG. 4 shows the configuration of a management terminal according to the first embodiment of the present invention.

FIG. 4 shows the configuration of the management terminal 200. The management terminal 200 includes a control unit 210, a storage unit 220, and a network connection unit 230. The control unit 210 is a processor that controls the management terminal 200 entirely. The control unit 210 reads a system program and an application program from a ROM (not shown in the drawings) through a bus to realize the functions of the following units in the control unit 210 by following the read system program and application program: an alarm detection unit 211 and an alarm notification unit 212.

The alarm detection unit 211 detects an alarm notified from the numerical controller 100. If the alarm detection unit 211 detects the alarm, the alarm notification unit 212 notifies an alarm to the terminal device 300. At this time, the terminal device 300 to receive the notification of the alarm may be determined uniquely by setting made in advance. Alternatively, if there are multiple terminal devices 300 as described above, one terminal device 300 may be selected based on the positions of these terminal devices 300 relative to each other and the operating situations of these terminal devices 300. Then, the alarm may be notified to the selected terminal device 300. The storage unit 220 stores the IP address of the terminal device 300, the operating situation of the terminal device 300, and the like, necessary for notification of the alarm from the alarm notification unit 212 to the terminal device 300. The network connection unit 230 connects the control unit 210 to the network 400.

[1.4 Terminal Device]

Figure 5:
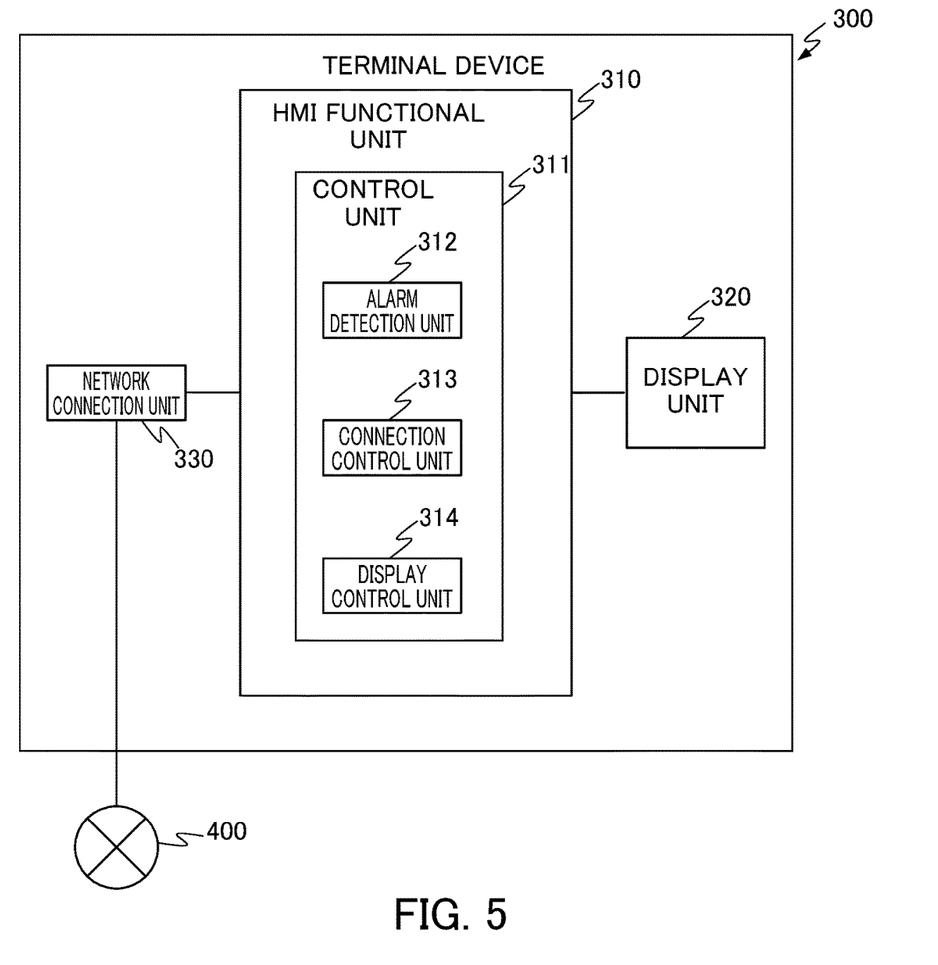
FIG. 5 shows the configuration of a terminal device according to the first embodiment of the present invention.

FIG. 5 shows the configuration of the terminal device 300. The terminal device 300 includes an HMI functional unit 310, a display unit 320, and a network connection unit 330. The HMI functional unit 310 includes a control unit 311. The control unit 311 is a processor that controls the HMI functional unit 310 entirely. The control unit 311 reads a system program and an application program from a ROM (not shown in the drawings) through a bus to realize the functions of the following units in the control unit 311 by following the read system program and application program: an alarm detection unit 312, a connection control unit 313, and a display control unit 314. The alarm detection unit 312 detects an alarm notified from the management terminal 200. If the alarm detection unit 312 detects the alarm, the connection control unit 313 connects to the numerical controller 100 through the network connection unit 330. Then, the connection control unit 313 disconnects the connection to the numerical controller 100. More specifically, the connection control unit 313 transmits a connection request to the numerical controller 100. If a connection enabling signal is received from the numerical controller 100, the connection control unit 313 establishes connection between the numerical controller 100 and the HMI functional unit 310. After data is displayed on the display unit 320 and after an instruction or data is input from a user to the display unit 320, the connection control unit 313 releases the connection to the numerical controller 100. The display control unit 314 generates display data based on information received from the numerical controller 100 through the network connection unit 330, and displays the generated display data on the display unit 320. The network connection unit 330 connects the HMI functional unit 310 to the network 400.

The display unit 320 displays data necessary for the numerical controller 100 for numerical control over the machine tool (not shown in the drawings) based on the display data received from the control unit 311. Further, the display unit 320 accepts operation from a user.

[1.5 Operation]

Figure 6:
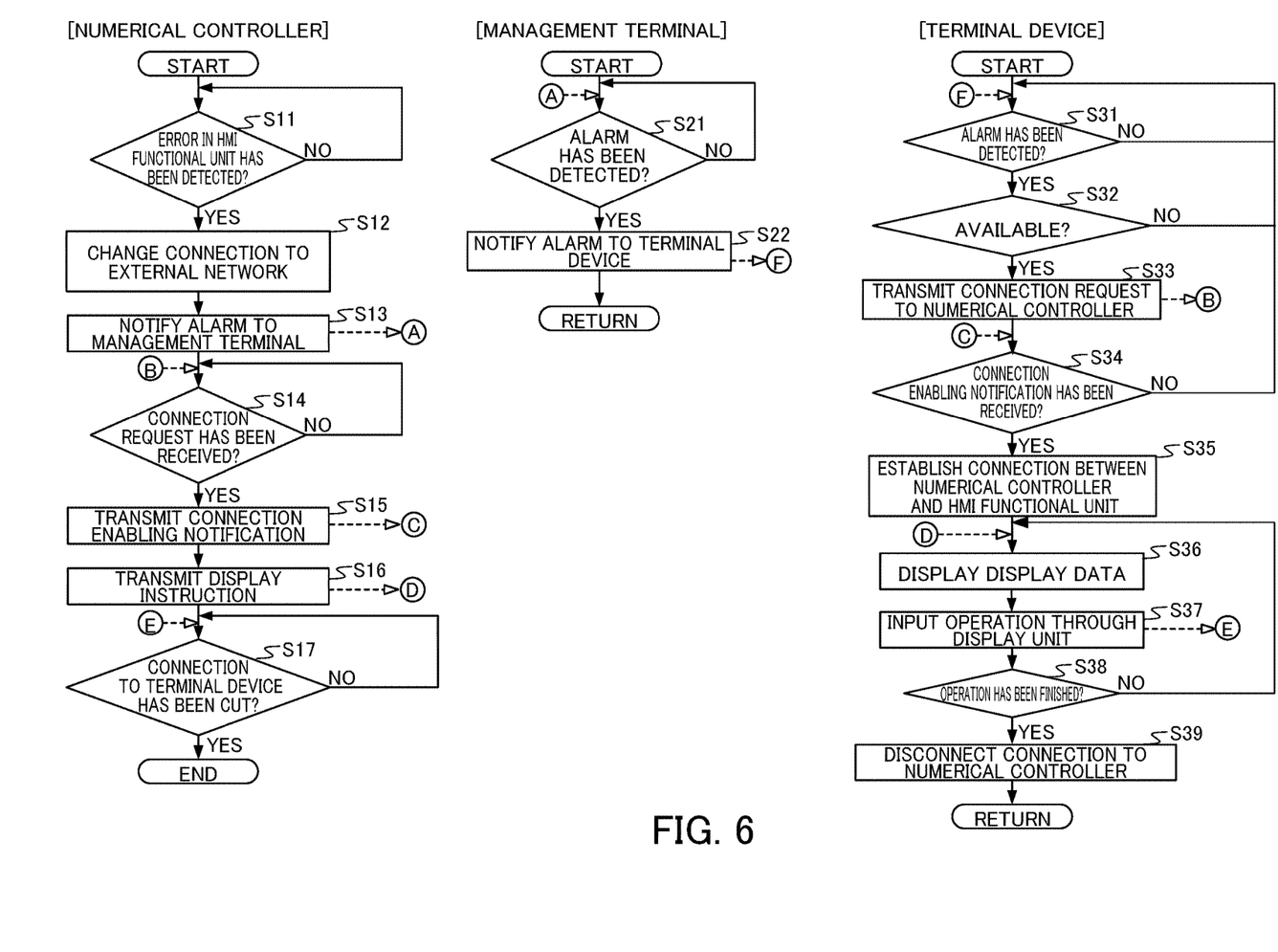
FIG. 6 shows working flows in the numerical control system according to the first embodiment of the present invention.

The following describes how the numerical control system 10 works in detail by referring to FIG. 6. A working flow in the numerical controller 100 will be described first.

In step S11, if the error detection unit 112 has detected an error in the HMI functional unit 120 (S11: YES), the processing shifts to step S12. If the error detection unit 112 has not detected an error (S11: NO), the processing returns to step S11.

In step S12, the connection control unit 113 changes a destination of connection of the numerical control unit 110 from the HMI functional unit 120 to the network 400.

In step S13, the alarm notification unit 114 notifies an alarm to the management terminal 200.

In step S14, if the connection control unit 113 has received a connection request signal from the terminal device 300 having received an alarm notified from the management terminal 200 (S14: YES), the processing shifts to step S15. If the connection control unit 113 has not received a connection request signal (S14: NO), the processing returns to step S14.

In step S15, the connection control unit 113 transmits a connection enabling notification signal to the terminal device 300. As a result, connection is established between the numerical controller 100 and the terminal device 300.

In step S16, the display instruction unit 115 transmits a display instruction to the terminal device 300.

In step S17, if the connection control unit 113 determines that the connection between the numerical controller 100 and the terminal device 300 has been disconnected (S17: YES), the numerical controller 100 finishes working (END). If the connection control unit 113 determines that the connection between the numerical controller 100 and the terminal device 300 has not been disconnected (S17: NO), the processing returns to step S17.

A working flow in the management terminal 200 will be described next. In step S21, if the alarm detection unit 211 has detected the alarm (S21: YES), the processing shifts to step S22. If the alarm detection unit 211 has not detected the alarm (S21: NO), the processing returns to step S21.

In step S22, the alarm notification unit 212 notifies an alarm to the terminal device 300. Then, the processing returns to step S21 (RETURN).

A working flow in the terminal device 300 will be described next. In step S31, if the alarm detection unit 312 has detected the alarm (S31: YES), the processing shifts to step S32. If the alarm detection unit 312 has not detected the alarm (S31: NO), the processing returns to step S31.

In step S32, if the terminal device 300 is available for operating the numerical controller 100 (S32: YES), the processing shifts to step S33. If the terminal device 300 is not available (S32: NO), the processing returns to step S31. A flag indicating whether or not the terminal device 300 is available for operating the numerical controller 100 may be set in advance. Alternatively, in response to detection of the alarm from the management terminal 200 by the alarm detection unit 312 in step S31 described above as a trigger, a message may be displayed on the display unit 320 asking a user to determine whether or not the terminal device 300 is to be available. Then, in response to a response from the user, the availability of the terminal device 300 may be determined.

In step S33, the connection control unit 313 transmits the connection request to the numerical controller 100.

In step S34, if the connection control unit 313 has received the connection enabling notification from the numerical controller 100 (S34: YES), the processing shifts to step S35. If the connection control unit 313 has not received the connection enabling notification from the numerical controller 100 (S34: NO), the processing returns to step S31.

In step S35, the connection control unit 313 establishes connection between the numerical controller 100 and the HMI functional unit 310.

In step S36, the display control unit 314 generates display data based on the display instruction received from the numerical controller 100, and displays the generated display data on the display unit 320.

In step S37, the user inputs operation on the numerical controller 100 through the display unit 320.

In step S38, if the operation from the user has been finished (S38: YES), the processing shifts to step S39. If the operation from the user has not been finished (S38: NO), the processing returns to step S36.

In step S39, the connection control unit 313 disconnects the connection to the numerical controller 100. Then, the processing returns to step S31 (RETURN).

[1.6 Effect by First Embodiment]

In the above-described numerical control system according to the first embodiment, if a problem occurs in the HMI function of the numerical controller, a screen for display can be switched to a display unit of a different device, and the numerical controller having the problem in the HMI function can be operated through the switched screen. Allowing use of the screen on the different device for display and operation acts advantageously, particularly for stopping a machine tool and doing maintenance work of the machine tool safely while checking the state of the machine tool.

2 Second Embodiment

A second embodiment of the present invention will be described below in detail by referring to FIGS. 7 to 9.

[2.1 Configuration of Invention]

Figure 7:
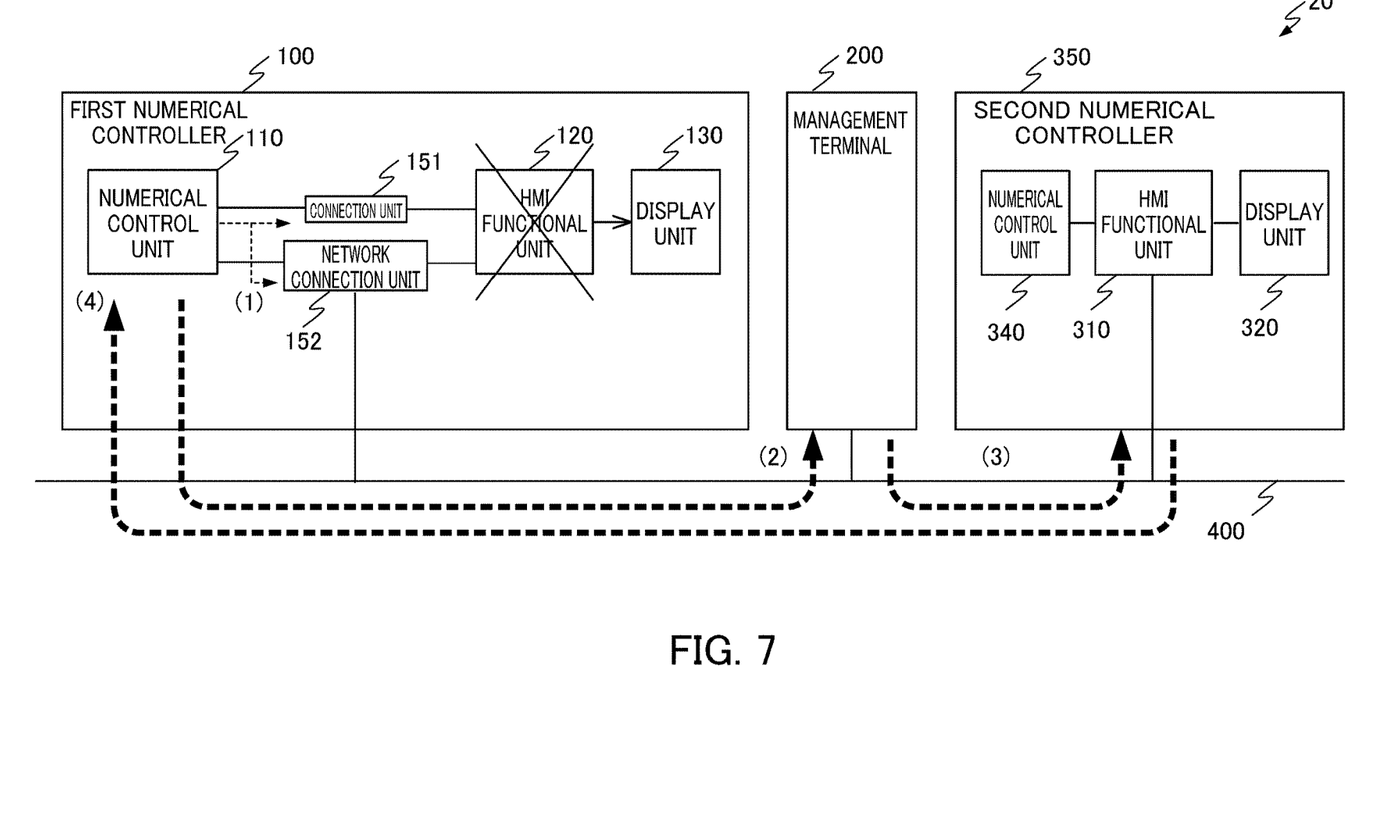
FIG. 7 shows the configuration of a numerical control system according to a second embodiment of the present invention.

FIG. 7 shows the configuration of a numerical control system 20 according to the second embodiment of the present invention. Constituting elements of the numerical control system 20 corresponding to those of the numerical control system 10 according to the first embodiment are identified by the same signs. The numerical control system 20 includes a first numerical controller 100, the management terminal 200, and a second numerical controller 350 connected to each other through the network 400. Specifically, the numerical control system 20 differs from the numerical control system 10 in that it includes the second numerical controller 350 instead of the terminal device 300. As shown in FIG. 7, the second numerical controller 350 includes the HMI functional unit 310 and the display unit 320 like the terminal device 300. The second numerical controller 350 further includes a numerical control unit 340.

The following briefly describes how the numerical control system 20 according to the second embodiment works. As shown by (1) in FIG. 7, the numerical control unit 110 releases connection to the connection unit 151 between the numerical control unit 110 and the HMI functional unit 120, and sets up connection to the network connection unit 152 between the numerical control unit 110 and the network 400. Next, as shown by (2), the numerical control unit 110 notifies an alarm to the management terminal 200 in a higher layer indicating the occurrence of a trouble in the HMI functional unit 120. In response to notification of the alarm as a trigger, a monitoring application starts working in the management terminal 200. In response to execution of this monitoring application, the management terminal 200 notifies an alarm to the second numerical controller 350 as shown by (3). Finally, as shown by (4), the HMI functional unit 310 of the second numerical controller 350 having received the notified alarm connects to the numerical control unit 110 of the first numerical controller 100 to display a screen necessary for numerical control and accept operation from a user.

[2.2 Second Numerical Controller]

Figure 8:
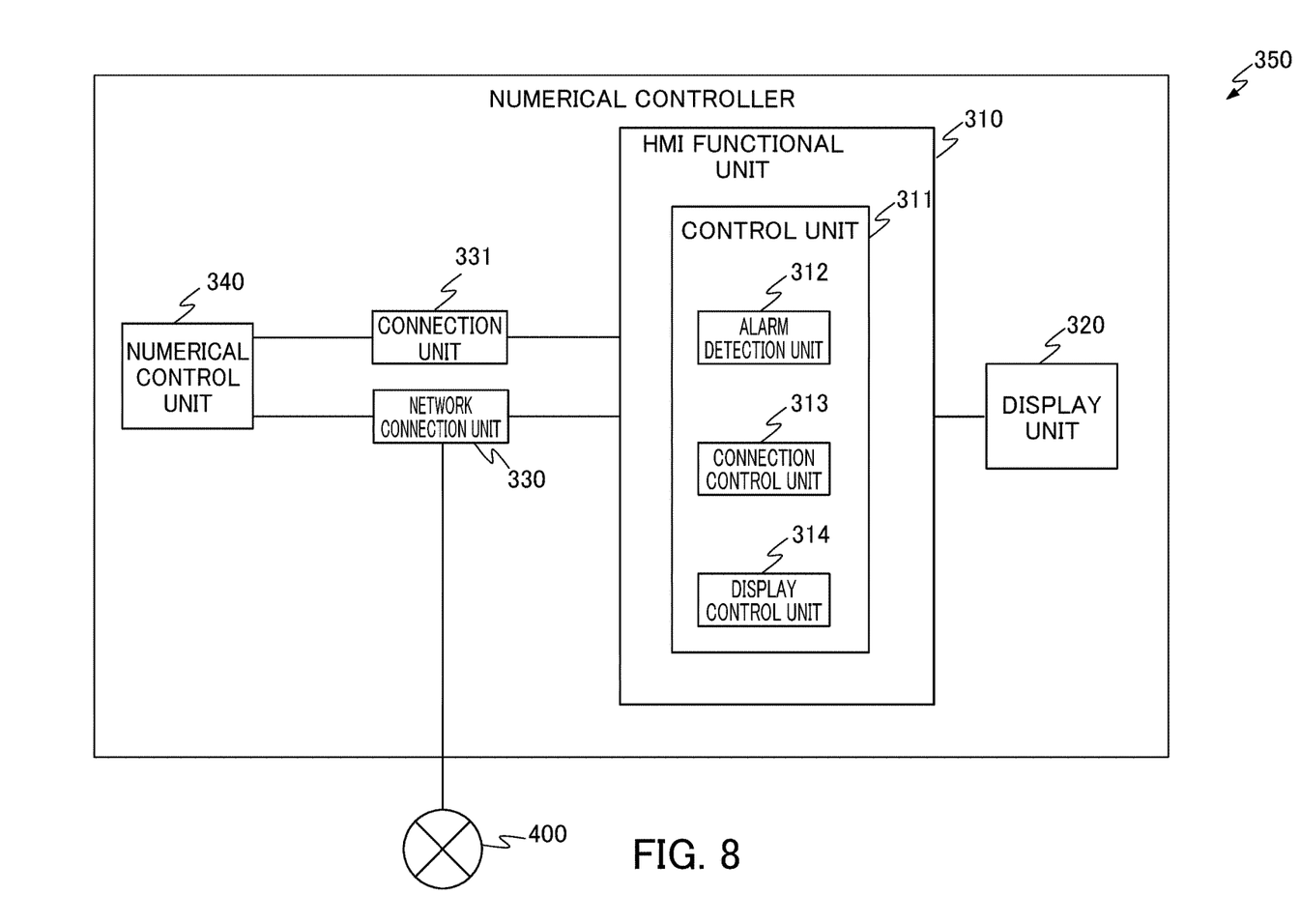
FIG. 8 shows the configuration of a numerical controller according to the second embodiment of the present invention.

FIG. 8 shows the configuration of the second numerical controller 350. Constituting elements of the second numerical controller 350 corresponding to those of the terminal device 300 according to the first embodiment are identified by the same signs and will not be described.

The second numerical controller 350 differs from the terminal device 300 according to the first embodiment in that it further includes the numerical control unit 340, and a connection unit 331 for connection between the numerical control unit 340 and the HMI functional unit 310. Like that of the numerical control unit 110 of the numerical controller 100 in each of the numerical control system 10 according to the first embodiment and the numerical control system 20 according to the second embodiment, one of the functions of the numerical control unit 340 is to execute a program for numerical control over a machine tool (not shown in the drawings) by the second numerical controller 350. Connection to the connection unit 331 is set and released by the connection control unit 313. Like the numerical controller 100 in each of the numerical control system 10 according to the first embodiment and the numerical control system 20 according to the second embodiment, the second numerical controller 350 may have a configuration and a function comparable to those of a general numerical controller. However, such a configuration and such a function will not be described.

[2.3 Operation]

Figure 9:
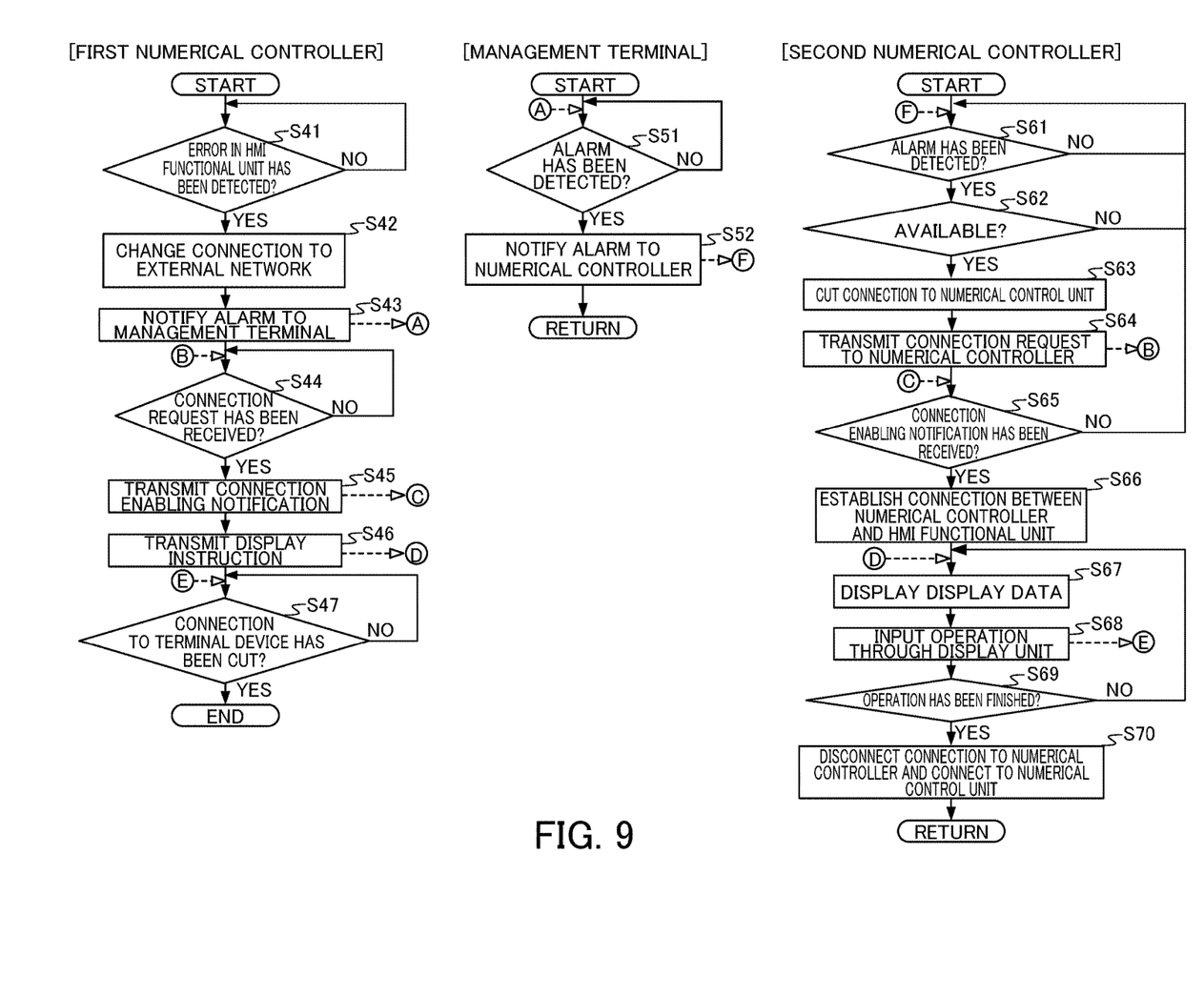
FIG. 9 shows working flows in the numerical control system according to the second embodiment of the present invention.

The following describes how the numerical control system 20 works in detail by referring to FIG. 9. A working flow in the first numerical controller 100 will be described first.

In step S41, if the error detection unit 112 has detected an error in the HMI functional unit 120 (S41: YES), the processing shifts to step S42. If the error detection unit 112 has not detected an error (S41: NO), the processing returns to step S41.

In step S42, the connection control unit 113 changes a destination of connection of the numerical control unit 110 from the HMI functional unit 120 to the network 400.

In step S43, the alarm notification unit 114 notifies an alarm to the management terminal 200.

In step S44, if the connection control unit 113 has received a connection request signal from the HMI functional unit 310 of the second numerical controller 350 having received an alarm notified from the management terminal 200 (S44: YES), the processing shifts to step S45. If the connection control unit 113 has not received a connection request signal (S44: NO), the processing returns to step S44.

In step S45, the connection control unit 113 transmits a connection enabling notification signal to the HMI functional unit 310 of the second numerical controller 350. As a result, connection is established between the first numerical controller 100 and the HMI functional unit 310 of the second numerical controller 350.

In step S46, the display instruction unit 115 transmits a display instruction to the HMI functional unit 310 of the second numerical controller 350.

In step S47, if the connection control unit 113 determines that the connection between the first numerical controller 100 and the HMI functional unit 310 of the second numerical controller 350 has been disconnected (S47: YES), the first numerical controller 100 finishes working (END). If the connection control unit 113 determines that the connection between the first numerical controller 100 and the HMI functional unit 310 of the second numerical controller 350 has not been disconnected (S47: NO), the processing returns to step S47.

A working flow in the management terminal 200 will be described next. In step S51, if the alarm detection unit 211 has detected the alarm (S51: YES), the processing shifts to step S52. If the alarm detection unit 211 has not detected the alarm (step S51: NO), the processing returns to step S51.

In step S52, the alarm notification unit 212 notifies an alarm to the second numerical controller 350. Then, the processing returns to step S51 (RETURN).

A working flow in the second numerical controller 350 will be described next. In step S61, if the alarm detection unit 312 has detected the alarm (S61: YES), the processing shifts to step S62. If the alarm detection unit 312 has not detected the alarm (S61: NO), the processing returns to step S61.

In step S62, if the HMI functional unit 310 of the second numerical controller 350 is available for operating the first numerical controller 100 (S62: YES), the processing shifts to step S63. If the HMI functional unit 310 of the second numerical controller 350 is not available (S62: NO), the processing returns to step S61. A flag indicating whether or not the HMI functional unit 310 of the second numerical controller 350 is available for operating the first numerical controller 100 may be set in advance. Alternatively, in response to detection of an alarm from the management terminal 200 by the alarm detection unit 312 in step S61 described above as a trigger, a message may be displayed on the display unit 320 asking a user to determine whether or not the HMI functional unit 310 is to be available. Then, in response to a response from the user, the availability of the HMI functional unit 310 may be determined.

In step S63, the connection control unit 313 disconnects connection by the connection unit 331 between the HMI functional unit 310 and the numerical control unit 340.

In step S64, the connection control unit 313 transmits the connection request to the first numerical controller 100.

In step S65, if the connection control unit 313 has received the connection enabling notification from the first numerical controller 100 (S65: YES), the processing shifts to step S66. If the connection control unit 313 has not received the connection enabling notification from the numerical controller 100 (S65: NO), the processing returns to step S61.

In step S66, the connection control unit 313 establishes connection between the first numerical controller 100 and the HMI functional unit 310. Further, the display control unit 314 displays a message on the display unit 320 indicating that data to be displayed on the display unit 320 is based on a display instruction from the numerical control unit 110 of the first numerical controller 100, not a display instruction from the numerical control unit 340 of the second numerical controller 350.

In step S67, the display control unit 314 generates display data based on the display instruction received from the first numerical controller 100, and displays the generated display data on the display unit 320.

In step S68, the user inputs operation on the first numerical controller 100 through the display unit 320.

In step S69, if the operation from the user has been finished (S69: YES), the processing shifts to step S70. If the operation from the user has not been finished (S69: NO), the processing returns to step S67.

In step S70, the connection control unit 313 disconnects the connection between the HMI functional unit 310 and the first numerical controller 100 and performs restoration work. Further, the display control unit 314 displays a message on the display unit 320 indicating that data to be displayed on the display unit 320 is based on a display instruction from the numerical control unit 340 of the second numerical controller 350, not a display instruction from the numerical control unit 110 of the first numerical controller 100. As a result, the HMI functional unit 310 generates display data again based on the display instruction from the numerical control unit 340 to control display on the display unit 320 (RETURN).

[2.4 Effect by Second Embodiment]

In the above-described numerical control system according to the second embodiment, if a problem occurs in the HMI function of the numerical controller, a screen for display can be switched to a display unit of a different device, and the numerical controller having the problem in the HMI function can be operated through the switched screen like in the numerical control system according to the first embodiment. Allowing use of the screen on the different device for display and operation acts advantageously, particularly for stopping a machine tool and doing maintenance work of the machine tool safely while checking the state of the machine tool.

[3.1 First Modification]

The numerical control system 10 according to the first embodiment includes only one terminal device 300. Alternatively, multiple terminal devices 300 may be provided and the management terminal 200 may select one from the multiple terminal devices 300. In this case, the management terminal 200 may have data indicating the positions of these terminal devices 300 relative to each other and the operating situations of these terminal devices 300. The management terminal 200 may select a terminal device 300 nearest the numerical controller 100 from multiple terminal devices 300 not being used for operation on a machine tool. Likewise, the numerical control system 20 according to the second embodiment includes only one second numerical controller 350. Alternatively, multiple second numerical controllers 350 may be provided and the management terminal 200 may select one from the multiple second numerical controllers 350.

[3.2 Second Modification]

In particular, if multiple terminal devices 300 or multiple second numerical controllers 350 are provided as described above, the numerical controller 100 may authenticate a terminal device 300 or a second numerical controller 350 trying to establish connection to the numerical controller 100. In this case, the numerical controller 100 may conduct authentication by storing a list in a storage unit (not shown in the drawings) containing the IP addresses of terminal devices 300 or those of second numerical controllers 350 permitted to establish connection, and making an authentication unit (not shown in the drawings) check the IP address of a terminal device 300 or that of a second numerical controller 350 trying to establish connection to the numerical controller 100 against the list.

[3.3 Third Modification]

As already described above, in the first and second embodiments, the connection unit 151 and the network connection unit 152 of the numerical controller 100 are realized by the same communication protocol and have the same interface, particularly, an Ethernet (registered trademark) interface. However, this is not to limit the embodiment of the present invention. A communication protocol other than Ethernet (registered trademark) may be used. Further, the connection unit 151 and the network connection unit 152 may have interfaces conforming to different standards. On the assumption that the connection unit 151 conforms to a first communication standard and the network connection unit 152 conforms to a second communication standard, these different standards can be established if the respective network connection units of the management terminal 200, the terminal device 300, and the second numerical controller 350 conform to the second communication standard.

[3.4 Fourth Modification]

The function of the HMI functional unit 120 of the numerical controller 100 may be realized by providing the HMI functional unit 120 to a board and inserting the board into a base of the numerical controller 100.

[3.5 Fifth Modification]

The management terminal 200 can be a general personal computer. Likewise, the terminal device 300 can be a general personal computer or a PC tablet as long as it includes the HMI functional unit 310 and the display unit 320. The management terminal 200 and the terminal device 300 may be realized by the same personal computer.

[3.6 Sixth Modification]

The alarm detection unit 211 and the alarm notification unit 212 of the control unit 210 of the management terminal 200 may be realized by execution of the monitoring application in the management terminal 200.

In the above-described embodiments, the function fulfilled by the numerical control system 10 and the function fulfilled by the numerical control system 20 are realized by software. To realize these functions by software, programs constituting this software are installed on a computer. These programs may be recorded in a removable medium and distributed to a user. Alternatively, these programs may be distributed by being downloaded onto a computer of the user through a network.

EXPLANATION OF REFERENCE NUMERALS 10 20 Numerical control system
100 350 Numerical controller
110 Numerical control unit
112 Error detection unit
113 Connection control unit
114 Alarm notification unit
120 HMI functional unit
122 Display control unit
130 Display unit
151 Connection unit
152 Network connection unit
200 Management terminal
210 Control unit (control unit)
211 Alarm detection unit
212 Alarm notification unit
230 Network connection unit
300 Terminal device
310 HMI functional unit
312 Alarm detection unit
313 Connection control unit
314 Display control unit
320 Display unit
330 Network connection unit
340 Numerical control unit
400 Network

What is claimed is:

1. A numerical control system comprising a numerical controller, a management terminal, and a terminal device connectable to each other through a network,
the numerical controller comprising:
a numerical control unit;
a Human Machine Interface (HMI) functional unit;
a display unit;
a connection unit for connection between the numerical control unit and the HMI functional unit; and
a network connection unit for connection to the network,
the HMI functional unit comprising:
a display control unit that generates display data based on information received from the numerical control unit through the connection unit, and displays the generated display data on the display unit,
the numerical control unit comprising:
an error detection unit that detects an error in the HMI functional unit;
a connection control unit that releases connection to the connection unit and sets up connection to the network connection unit if the error detection unit detects the error in the HMI functional unit; and
an alarm notification unit that notifies a first alarm to the management terminal through the network connection unit,
the management terminal comprising:
a control unit; and
a network connection unit for connection to the network,
the control unit comprising:
a first alarm detection unit that detects the first alarm notified from the numerical controller; and
a second alarm notification unit that notifies a second alarm to the terminal device if the first alarm detection unit detects the first alarm,
the terminal device comprising:
a display unit for display of data;
an HMI functional unit; and
a network connection unit for connection between the network and the HMI functional unit of the terminal device,
the HMI functional unit of the terminal device comprising:
a second alarm detection unit that detects the second alarm notified from the management terminal;
a connection control unit that connects to the numerical controller through the network connection unit of the terminal device if the second alarm detection unit detects the second alarm; and
a display control unit that generates display data based on information received from the numerical controller through the network connection unit of the terminal device, and displays the generated display data on the display unit of the terminal device so that a user is able to input an instruction or data based on the generated display data.

2. The numerical control system according to claim 1, wherein the connection unit for connection between the numerical control unit and the HMI functional unit, the network connection unit for connection between the numerical controller and the network, the network connection unit for connection between the management terminal and the network, and the network connection unit for connection between the terminal device and the network have the same interface.

3. The numerical control system according to claim 2, wherein the interface is an ETHERNET (registered trademark) interface.

4. The numerical control system according to claim 1, wherein the second alarm notification unit selects one terminal device from multiple terminal devices, and notifies the second alarm to the selected terminal device.

5. The numerical control system according to claim 1, wherein the terminal device is a numerical controller further comprising a numerical control unit.

6. A numerical controller connectable to a management terminal and a terminal device through a network, the numerical controller comprising:
a numerical control unit;
a Human Machine Interface (HMI) functional unit;
a display unit;
a connection unit for connection between the numerical control unit and the HMI functional unit; and
a network connection unit for connection to the network,
the HMI functional unit comprising:
a display control unit that generates display data based on information received from the numerical control unit through the connection unit, and displays the generated display data on the display unit,
the numerical control unit comprising:
an error detection unit that detects an error in the HMI functional unit;

a connection control unit that releases connection to the connection unit and sets up connection to the network connection unit if the error detection unit detects the error in the HMI functional unit; and an alarm notification unit that notifies a first alarm to the management terminal through the network connection unit, wherein the management terminal notifies a second alarm to the terminal device when detecting the first alarm, and the terminal device connects to the numerical controller when detecting the second alarm, generates display data based on information received from the numerical controller, and displays the generated display data so that a user is able to input an instruction or data based on the generated display data.

7. The numerical controller according to claim 6, wherein the connection unit for connection between the numerical control unit and the HMI functional unit, and the network connection unit for connection between the numerical controller and the network have the same interface.

8. The numerical controller according to claim 7, wherein the interface is an ETHERNET (registered trademark) interface.

\* \* \* \* \*